United States Patent
Kumar

(10) Patent No.: US 7,565,459 B2
(45) Date of Patent: Jul. 21, 2009

(54) COMBINATION I/O MODULES IN A MODULAR AUTOMATION CONTROLLER

(76) Inventor: Shalabh Kumar, 4140 Utica Ridge Rd., Bettendorf, IL (US) 52722

(*) Notice: Subject to any disclaimer, the term of this patent is extended or adjusted under 35 U.S.C. 154(b) by 220 days.

(21) Appl. No.: 11/625,343

(22) Filed: Jan. 22, 2007

(65) Prior Publication Data

US 2007/0183169 A1 Aug. 9, 2007

Related U.S. Application Data

(60) Provisional application No. 60/766,475, filed on Jan. 21, 2006.

(51) Int. Cl.
| | |
|---|---|
| *G06F 3/00* | (2006.01) |
| *G06F 13/12* | (2006.01) |
| *G06F 13/38* | (2006.01) |
| *G01R 27/28* | (2006.01) |
| *G01R 31/00* | (2006.01) |
| *H03M 7/00* | (2006.01) |
| *H02H 3/00* | (2006.01) |
| *H02H 5/00* | (2006.01) |
| *H02J 1/00* | (2006.01) |
| *H02J 3/00* | (2006.01) |
| *H02M 3/22* | (2006.01) |
| *H02M 5/40* | (2006.01) |

(52) U.S. Cl. .............. 710/21; 710/2; 710/7; 710/69; 710/70; 700/293; 700/295; 700/298; 702/120; 341/50; 361/59; 361/91.1; 363/15; 363/34

(58) Field of Classification Search .............. 700/292, 700/293, 295, 297, 298; 702/117, 120; 710/2, 710/5, 7, 20, 21, 58, 65, 69, 70, 106; 323/267; 323/282; 341/126, 144, 155, 50; 361/59, 361/62, 88, 91.1, 93.1; 363/13, 15, 34

See application file for complete search history.

(56) References Cited

U.S. PATENT DOCUMENTS

| | | | | |
|---|---|---|---|---|
| 3,990,019 | A | * | 11/1976 | Crockett et al. ........... 330/207 P |
| 4,086,570 | A | * | 4/1978 | Wakasa et al. .......... 340/825.77 |
| 4,667,133 | A | * | 5/1987 | Nilssen ........................ 315/312 |
| 5,091,816 | A | | 2/1992 | Juntenen |
| 5,168,441 | A | * | 12/1992 | Onarheim et al. ............... 700/17 |
| 5,210,698 | A | * | 5/1993 | Topmiller .................... 700/202 |
| 5,677,618 | A | * | 10/1997 | Fiez et al. .................... 323/282 |
| 6,392,901 | B1 | * | 5/2002 | Colver et al. ................. 361/826 |
| 6,426,611 | B1 | * | 7/2002 | Reeves et al. ................ 323/267 |
| 6,640,264 | B1 | * | 10/2003 | Moore .......................... 710/29 |
| 6,725,304 | B2 | * | 4/2004 | Arimilli et al. .............. 710/106 |
| 7,091,412 | B2 | * | 8/2006 | Wang et al. .................. 174/391 |
| 7,113,882 | B2 | * | 9/2006 | Liu et al. ..................... 702/120 |
| 7,444,164 | B2 | * | 10/2008 | Yowakim et al. .......... 455/550.1 |
| 2002/0114601 | A1 | * | 8/2002 | Kagami et al. ............... 385/123 |
| 2007/0053126 | A1 | * | 3/2007 | Chou ......................... 361/93.1 |

OTHER PUBLICATIONS

Horner APG, Supplement for SmartStack Modules, Revised Sep. 26, 2001: pp. 123-128. Revised Dec. 20, 2001: pp. 97-102.
Horner APG, Datasheets for SmartStack Modular I/O, 2005.
Automation Direct 2004 Catalog selected pages, 2004.
GE Fanuc Automation VersaMax I/O and Control, 1999.

* cited by examiner

*Primary Examiner*—Crystal J Barnes Bullock
(74) *Attorney, Agent, or Firm*—Thomas R. Vigil

(57) ABSTRACT

The invention describes combination I/O modules for automation. Various combinations of inputs and output with different electrical interfaces are offered providing greater flexibility in controller hardware selection.

10 Claims, 3 Drawing Sheets

COMBINATION I/O MODULES IN A MODULAR AUTOMATION CONTROLLER

CROSS REFERENCE TO RELATED APPLICATIONS

This application is entitled to the benefit of Provisional Patent Application Ser. No. 60/766,475 submitted on Jan. 21, 2006.

FEDERALLY SPONSORED RESEARCH

Not applicable.

SEQUENCE LISTING OR PROGRAM

Not applicable

FIELD OF THE INVENTION

The present invention relates to the field of industrial control or automation, particularly I/O (input/output) modules.

BACKGROUND OF INVENTION

The current modular automation controller offers a variety of discrete input and output (I/O) modules, such as DC Input, DC Output, AC Input, AC Output, etc. However a module offers only one type of functionality: input or output, and only one type of electrical interface for that functionality: such as DC or AC. For example an input module will provide only input, and output module will provide only output functionality, and all the points of a module will have same electrical characteristics. This many times forces users to buy more hardware than necessary. For example if a controller offers 32-point modules and a user requires only, say, 1 input and 1 output, the user would need to buy two modules: one input module and one output module, even though physically one module would have served the purpose. In addition, some times need for additional I/O may necessitate going to a larger controller rack or adding a remote rack, though many I/O points in the existing rack may be unused because of wrong functionality type.

Similar situation exist with respect to electrical interface. A module offers all the discrete point of same electrical type. For example a 32 point DC output module will have same electrical characteristics for all the 32 points. If a user needs one DC output and one AC output, the user needs to buy a two modules.

Current invention presents combination I/O modules that offer input and output functionality on the same module, and modules with more than one type of electrical interface to field devices on the same module. By offering judicious combinations of various input and output type, the invention allows users select optimal hardware for their controller.

DESCRIPTION OF INVENTION

Currently available Modular Automation Controllers provide variety of I/O modules each offering only one type of functionality: Input or Output. This invention presents I/O modules with a variety of combinations. That is the same module supports inputs as well as outputs. In addition the inputs and outputs of different electrical types are mixed, such as DC and AC. Combination I/O modules offer flexibility to users to optimize their controller hardware.

Figure 1:
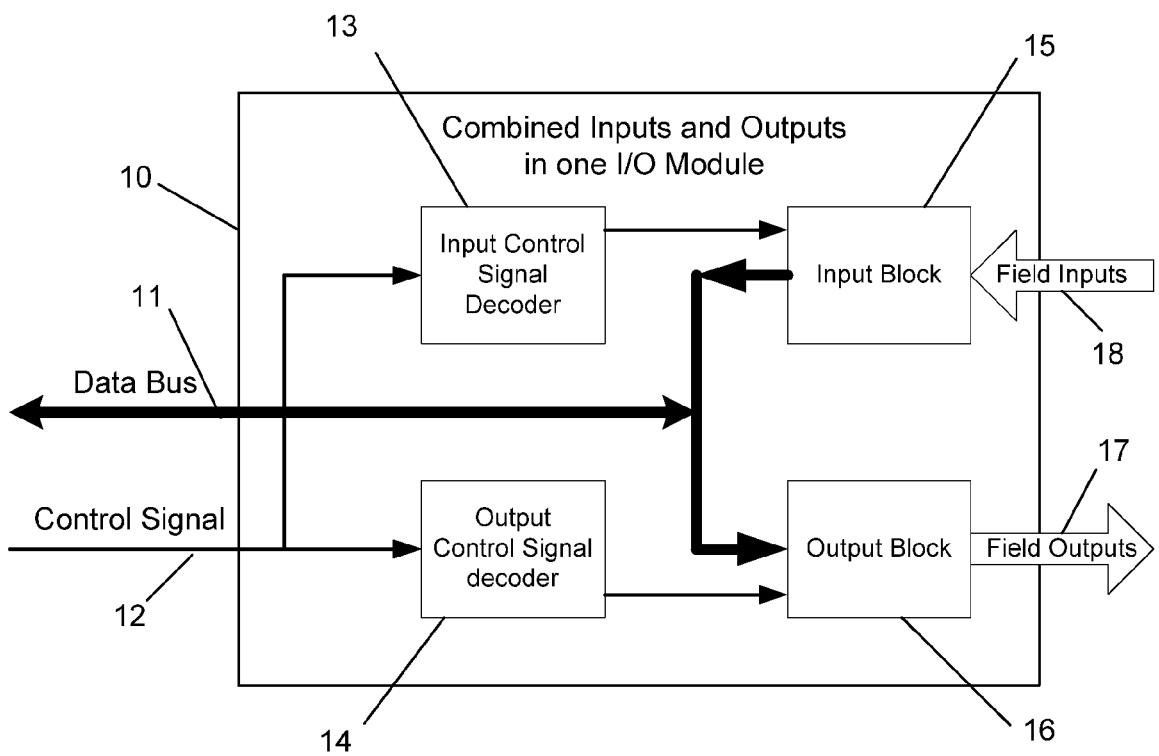
FIG. 1 shows a block diagram of an I/O module that provides both inputs and outputs.

FIG. 1 shows architecture of an I/O module 10 with combination of inputs and outputs. Automation Controller Signals coming to the module are divided in data bus 11 and control bus 12. Control bus 12 has all the signals necessary to address the module and read as well as write to the module. Input Control Signal Decoder 13 decodes signals from control bus 12 to control the Input block 15. Input block 15 provides necessary signal conditioning and interface to field inputs 18. Output Control Signal Decoder 14 provides decoding of control bus 12 signals to control the output block 16. The output block 16 provides necessary interface to field devices 17. Data Bus 11 can be a parallel bus or a serial bus, such as SPI or I$^2$C.

Figure 2:
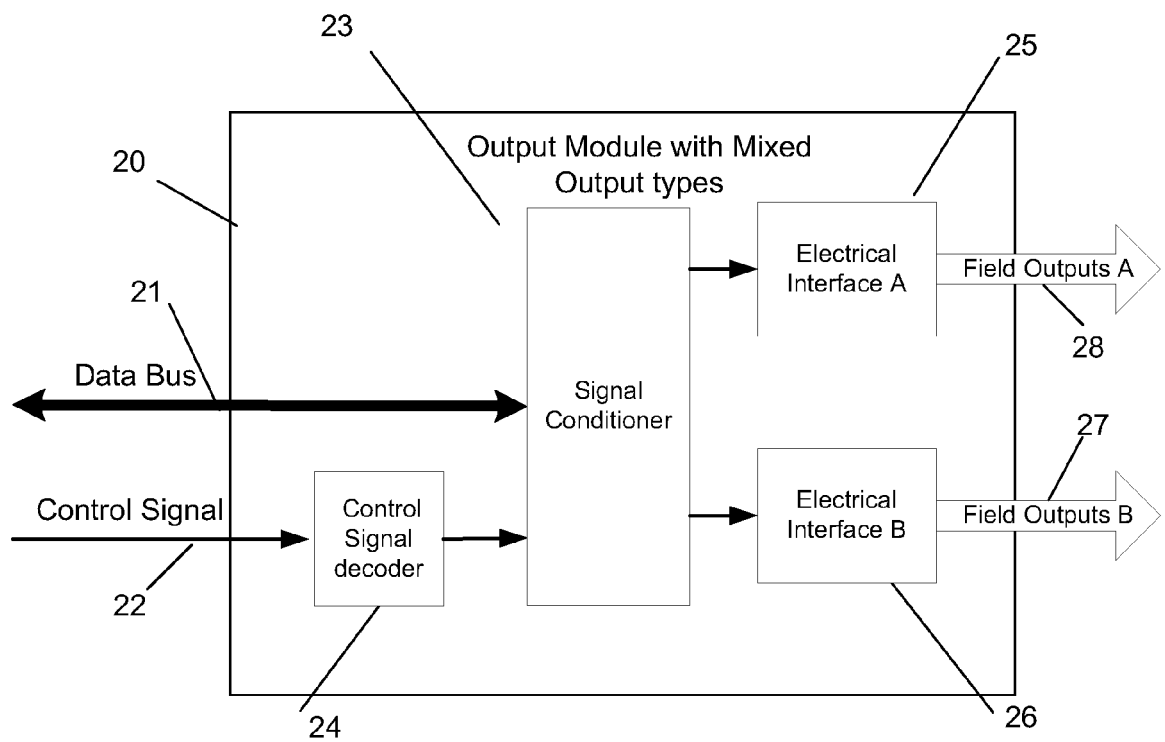
FIG. 2 shows an output module with more than one type of electrical interface to field devices.

FIG. 2 shows an output module with two different types of electrical interfaces to field devices. Examples of different electrical interfaces types are DC, TTL, AC, Relay, etc. Although only two types are shown in the figure, a module can have more than two types of electrical interfaces. Module 20 connects to a controller using data bus 21 and control signals 22. Control signal decoder 24 decodes control bus signals to control signal conditioner 23. Signal Conditioner 23 may include output latches, optical isolators, etc as Per requirements. Electrical interface A 25 interfaces with compatible field devices 28, while electrical interface B 26 provides signals to devices 27 of that type. For example interface A 25 may provide 24 VDC outputs while interface B 26 may provide 120 VAC output.

Figure 3:
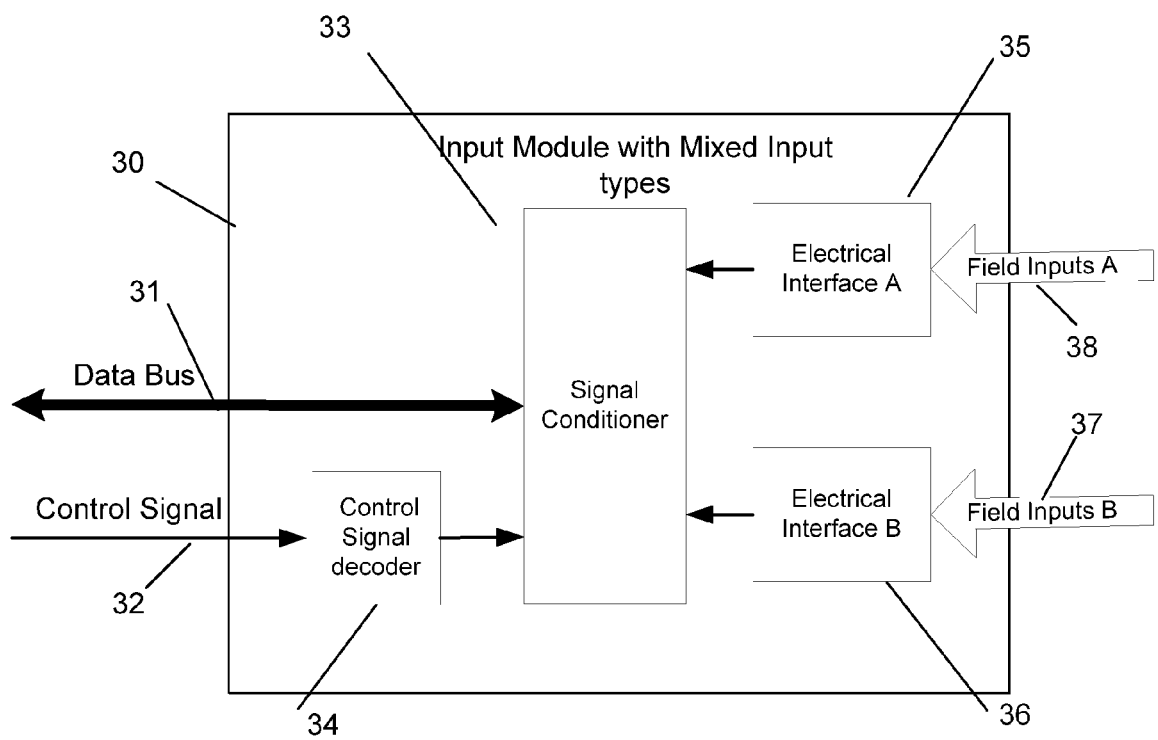
FIG. 3 shows an input module with more than one type of electrical interface to field devices.

FIG. 3 shows an input module with two different types of electrical interfaces to field devices. Examples of different electrical interfaces types are DC, TTL, AC, etc. Although only two types are shown in the figure, a module can have more than two types of electrical interfaces. Module 30 connects to a controller using data bus 31 and control signals 32. Control signal decoder 34 decodes control bus signals to control signal conditioner 33. Signal Conditioner 33 may include buffers, optical isolators, etc as per requirements. Electrical interface A 35 interfaces with compatible input field devices 38, while electrical interface B 36 provides signals to devices 37 of that type. For example interface A 25 may provide 24 VDC input while interface B 26 may provide 120 VAC input.

The concept of combining electrical interfaces may also be used in the module of FIG. 1. That is the module can offer input of different electrical types, as well as outputs of different electrical types of on the same module.

A variety of combination modules are offered using general architecture described in FIG. 1, FIG. 2 and FIG. 3. These include:

(1) DC Inputs and DC Outputs
(2) DC Outputs and AC Outputs
(3) AC Inputs and DC Outputs
(4) DC Inputs and AC Outputs
(5) AC Inputs and Relay Outputs
(6) DC Inputs and Relay Outputs
(7) Analog Inputs and Analog Outputs (Voltage)
(8) Analog Inputs and Analog Outputs (Current)

In addition, the outputs of these modules are short circuit protected. The modules effectively shut off when the current drawn is above the rated current of the module. This is done by sensing the current. The output current is sensed by passing current through a low value series resistor. The value of resistor is so chosen that it would trigger shutdown if more than rated current is passed through the resistor. Once in shut down, the output tries to recover continuously. When the current drawn is lower than modules rated current, the module outputs starts working again. This feature prevents damages to the outputs that commonly occur in field if the outputs are not protected.

What is claimed is:

1. An I/O module for use in a modular automation controller, said I/O module having means to:
   a) electrically connect to said automation controller;
   b) transmit variety of electrical signals from plurality of input devices to said automation controller simultaneously;
   c) transmit variety electrical signals from said automation controller to plurality of output devices simultaneously.

2. The I/O module of claim 1, having means to interface with a plurality of DC input devices and plurality of DC output devices.

3. The I/O module of claim 1, having means to interface with a plurality of AC input devices and plurality of DC outputs devices.

4. The I/O module of claim 1, having means to interface with plurality of DC input devices and plurality of AC output devices.

5. The I/O module of claim 1, having means to interface with plurality of AC input devices and plurality of Relay output devices.

6. The I/O module of claim 1, having means to interface with plurality of DC input devices and plurality of relay output devices.

7. An output module for use in a modular automation controller, said output module having means to:
   a) electrically connect to said automation controller;
   b) transmit electrical signals from said automation controller to variety of output devices simultaneously;
   c) detect an overload or short circuit condition in said output devices.

8. An output module of claim 7, having means to prevent damage to said module in case of overload or short circuit condition in the output device.

9. An output module of claim 7, having means to turn back on properly when the overload or short circuit condition is removed.

10. The output module of claim 7 further comprising means for transmitting a variety of electrical signals from a plurality of input devices to said automation controller simultaneously.

* * * * *